(12) United States Patent
Jiang et al.

(10) Patent No.: US 12,206,596 B1
(45) Date of Patent: Jan. 21, 2025

(54) DYNAMIC PROVISIONING FOR VIRTUAL SERVER INSTANCES

(71) Applicant: International Business Machines Corporation, Armonk, NY (US)

(72) Inventors: Peng Hui Jiang, Beijing (CN); Na Fei Yang, Beijing (CN); Xi Qing Zhang, Bao Sheng Li (CN); Cheng Cheng Dong, Beijing (CN); Su Liu, Austin, TX (US)

(73) Assignee: INTERNATIONAL BUSINESS MACHINES, Armonk, NY (US)

( * ) Notice: Subject to any disclaimer, the term of this patent is extended or adjusted under 35 U.S.C. 154(b) by 0 days.

(21) Appl. No.: 18/342,100

(22) Filed: Jun. 27, 2023

(51) Int. Cl.
*H04L 47/78* (2022.01)
*H04L 47/70* (2022.01)
*H04L 47/74* (2022.01)

(52) U.S. Cl.
CPC .......... *H04L 47/781* (2013.01); *H04L 47/746* (2013.01); *H04L 47/822* (2013.01)

(58) Field of Classification Search
CPC . H04L 47/746; H04L 47/7781; H04L 47/822; H04L 47/823
See application file for complete search history.

(56) References Cited

U.S. PATENT DOCUMENTS

| 8,429,448 | B1* | 4/2013 | Vohra | G06F 11/2043 714/4.2 |
|---|---|---|---|---|
| 9,229,784 | B2 | 1/2016 | DeJana et al. | |
| 9,531,604 | B2 | 12/2016 | Akolkar et al. | |
| 9,811,370 | B2 | 11/2017 | DeJana et al. | |
| 2009/0300210 | A1* | 12/2009 | Ferris | H04L 47/78 709/235 |
| 2013/0073716 | A1 | 3/2013 | DeJana et al. | |
| 2014/0089509 | A1* | 3/2014 | Akolkar | H04L 41/147 709/226 |
| 2016/0055028 | A1 | 2/2016 | DeJana et al. | |
| 2016/0205039 | A1 | 7/2016 | Akolkar et al. | |
| 2016/0373405 | A1* | 12/2016 | Miller | G06F 9/45558 |
| 2016/0379125 | A1* | 12/2016 | Bordawekar | G06F 9/5027 706/12 |
| 2018/0343164 | A1* | 11/2018 | Wylie | G06F 9/50 |
| 2019/0250949 | A1* | 8/2019 | Chen | H04L 47/83 |
| 2020/0034745 | A1 | 1/2020 | Nagpal et al. | |
| 2020/0285502 | A1* | 9/2020 | Hildebrand | G06F 9/45554 |

(Continued)

OTHER PUBLICATIONS

De et al., "Caching Techniques for Rapid Provisioning of Virtual Servers in Cloud Environment", In2012 IEEE Network Operations and Management Symposium, Apr. 16, 2012, pp. 562-565.

(Continued)

*Primary Examiner* — Jeong S Park
(74) *Attorney, Agent, or Firm* — Tutunjian & Bitetto, P.C.; Jared Chaney

(57) ABSTRACT

Methods and systems for provisioning resources includes classifying a request for a virtual server instance (VSI) according to resources specified in the request. Dependent resources that the VSI will use are predicted based on the specified resources. A provisioning plan is generated, including timing and configuration information, based on the specified resources and the dependent resources. Resources for the VSI are provisioned according to the provisioning plan, including allocating hardware resources on a computing system.

20 Claims, 8 Drawing Sheets

(56) References Cited

U.S. PATENT DOCUMENTS

| | | |
|---|---|---|
| 2020/0310886 A1* | 10/2020 | Rajamani ............ G06F 9/45558 |
| 2022/0027207 A1 | 1/2022 | Kakaiya et al. |
| 2022/0027222 A1 | 7/2022 | Jagannathan et al. |
| 2023/0108661 A1* | 4/2023 | Adogla ............... H04L 67/1031 |
| | | 713/2 |

OTHER PUBLICATIONS

Dow et al., "Inciting Cloud Virtual Machine Reallocation With Supervised Machine Learning and Time Series Forecasts", InProceedings of the enterprise compute conference (ECC). Available at https://ecc. marist. edu/conf2015/pres/DowIncite-Presentation-ECC2015, Jun. 2015, pp. 1-22.

* cited by examiner

DYNAMIC PROVISIONING FOR VIRTUAL SERVER INSTANCES

BACKGROUND

The present invention generally relates to virtualized computing and, more particularly, to dynamically provisioning virtual server instances.

A virtual server instance transforms a given physical system into a pool of logical computing resources. Operating systems and applications may be isolated into virtual machines that may be implemented on a multi-server cloud computing architecture. These virtual servers are scalable and can be provisioned with any appropriate amount of computing resources, including processing cores and memory allocations. Virtual server instances can be flexibly allocated by customers on an as-needed basis, for example with new instances being added in a matter of minutes.

However, virtual server infrastructures may include many dependencies, including storage, network, and computing resources, as well as software resources. Virtual server instances therefore need to be built in a consistent way, which grows more challenging as the size and complexity of the virtual server infrastructure increases. When provisioning fails, it can be particularly difficult to identify the reason for the failure of a particular resource.

SUMMARY

A method for resource provisioning includes classifying a request for a virtual server instance (VSI) according to resources specified in the request. Dependent resources that the VSI will use are predicted based on the specified resources. A provisioning plan is generated, including timing and configuration information, based on the specified resources and the dependent resources. Resources for the VSI are provisioned according to the provisioning plan, including allocating hardware resources on a computing system.

A system for resource provisioning includes a hardware processor and a memory that stores a computer program. When executed by the hardware processor, the computer program causes the hardware processor to classify a request for a virtual server instance (VSI) according to resources specified in the request, to predict dependent resources that the VSI will use based on the specified resources, to generate a provisioning plan, including timing and configuration information, based on the specified resources and the dependent resources, and to provision resources for the VSI according to the provisioning plan, including allocating hardware resources on a computing system.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
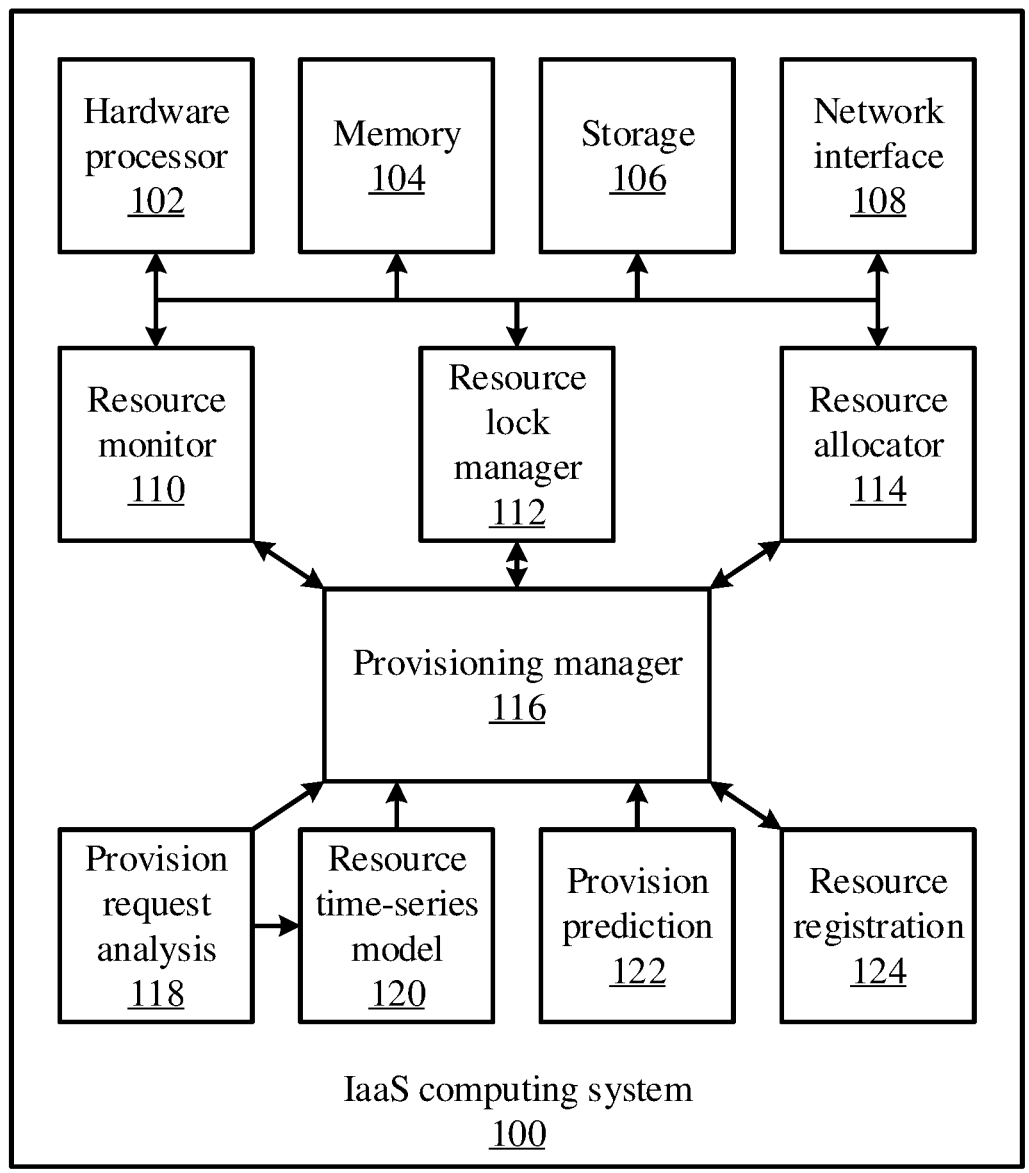
FIG. 1 is a block diagram of an infrastructure as a service (IaaS) computing system that includes dynamic resource provisioning for virtual server instances, in accordance with an embodiment of the present invention.

When deploying virtual server instances (VSIs), such as in virtual private cloud computing environments, many different dependencies may be implicated. Such dependencies may include hardware dependencies, including storage, network, and computing resources, as well as software dependencies, such as operating systems, libraries, and software packages. Such dependencies need to be built in a consistent way so that a virtual server instance can be accurately built.

Virtual server instance provisioning can depend on the readiness of all the dependent resources. In some cases, provisioning may fail due to a failure in provisioning one or more of the dependent resources. In a public cloud system, it can be difficult to identify the root cause for the provisioning failure.

To address this issue and to ensure that virtual server instances can be provisioned correctly when needed, a dynamic provisioning plan can be created. The virtual server instances in a given system may be analyzed and classified according to preexisting provisioning information, which may identify known dependent resources that are needed for the respective virtual server instances to operate. Toward that end, resource information may be collected from a datacenter, including the physical resources that are available to run a virtual server instance on.

The logs produced by provisioning different kinds of virtual server instances can be reviewed to construct a time-series resource consumption model, which provides information relating to dependency paths. Dependent resources can then be locked along this path to predict a timeline of dependencies. When a provisioning request is received for a virtual server instance, the availability of dependent resources can be determined and the time-series resource consumption database can be updated to adjust the provisioning plan for subsequent provisioning requests. When there is a failure of one of the dependent resources, failure information can be published to a registration center so that the provisioning plan can be adapted to accommodate the deficiency. When the provisioning manager receives published dependency failure information, other resources may be allocated to provision requests.

According to an aspect of the invention, a computer-implemented method for resource provisioning includes classifying a request for a VSI according to resources specified in the request. Dependent resources that the VSI will use are predicted based on the specified resources. A provisioning plan is generated, including timing and configuration information, based on the specified resources and the dependent resources. Resources for the VSI are provisioned according to the provisioning plan, including allocating hardware resources on a computing system. This aspect of the invention provides a provisioning plan that is used to dynamically allocate resources to a VSI, including dependent resources.

In embodiments, generating the provisioning plan includes determining an order of provisioning tasks for the specified resources and the dependent resources based on dependency relationships. This feature is separable from the others and is optional. Determining the order of the provisioning tasks helps to preserve dependency relationships between resources.

In embodiments, provisioning resources includes executing the provisioning tasks according to the determined order to ensure availability of dependent resources. This feature is separable from the others and is optional. Executing the provisioning tasks according to the determined order helps to preserve dependency relationships between resources.

In embodiments, a failure of a provisioned resource for the VSI is detected and the provisioning plan is modified to allocate additional resources to compensate for the failure of the provisioned resource. This feature is separable from the others and is optional. Detection of resource failures and modification of the provisioning plan provides dynamic adaptability to provisioned VSIs.

In embodiments, modifying the provisioning plan includes deallocating resources from a second VSI to make them available for the provisioning plan. This feature is separable from the others and is optional. Reallocation of resources from the second VSI helps to balance resource loads.

In embodiments, resource usage by the VSI is evaluated after provisioning to determine over- or under-utilization of the provisioned resources. This feature is separable from the others and is optional. Determining over- or under-utilization of provisioned resources helps to balance resource loads.

In embodiments, the provisioning plan is modified to deallocate or allocate resources to correct respective over- or under-utilization conditions. This feature is separable from the others and is optional. Reallocating resources that are over- or under-utilized helps to balance resource loads.

In embodiments, generating the provisioning plan includes a determination of resources available at the computing system, including allocated resources and unallocated resources. This feature is separable from the others and is optional. Determining both allocated and unallocated resources when generating the provisioning plan helps to balance resource loads.

In embodiments, classifying the request includes predicting future resource usage based on a resource time-series model that is trained on historical provisioning data. This feature is separable from the others and is optional. Classifying the request based on the resource time-series model helps to preserve information about resource usage from previous occasions.

In embodiments, the configuration information includes configuration details for the hardware resources and for software resources requested by the VSI. Including both hardware and software configuration information in the provisioning plan helps to maintain dependency relationships between hardware and software resources.

Referring now to the drawings in which like numerals represent the same or similar elements and initially to FIG. 1, an exemplary Infrastructure as a Service (IaaS) computing system 100 is shown. The IaaS computing system 100 includes certain hardware resources, including a hardware processor 102, a memory 104, storage 106, and a network interface 108. These resources may be allocated to virtual server instances when they are provisioned.

The resources are managed by a set of services, including a resource monitor 110, a resource lock manager 112, and a resource allocator 114. The resource monitor 110 gathers information about the physical resources, for example by monitoring their availability and usage. Resource allocator 114 determines what resources are needed for a given virtual server instance and assigns them accordingly.

The resource allocator 114 may manage and assign available resources to different virtual server instances, optimizing the utilization of resources to ensure efficient allocations and maximizing overall system performance. The resource allocator 114 may interact with physical resources of the system by monitoring their availability and status, for example keeping track of the current state of hardware processors, memory, storage, network bandwidth, and any other hardware or software components that are specified as being valuable resources within the system. The resource allocator 114 may act as a middle layer between the physical resources and the provisioning manager 116, managing the allocation of allocation process by considering resource availability, utilization, and system requirements. The resource allocator 114 thereby optimizes system performance and ensures efficient resource utilization within a given system or environment.

Resource lock manager 112 locks dependent resources based on a predicted timeline of the virtual server instances' usage to prevent resource contention during the provisioning process. The resource lock manager 112 receives input from provisioning manager 116 regarding what resources need to be locked, and for how long. Different resource agents may control the actual physical resources and may manage the pool of available resources of a given type, locking them in advance of an upcoming provisioning request.

A provisioning manager 116 collects resource usage and availability information from the resource monitor 110, using that information to calculate the availability of any required resources and dependent resources. As used herein, dependent resources indicate a relationship between the virtual server instance and their supported components. Resource registration 124 manages the subscription and publication of provisioning requests and resource failure information. It receives input from the provisioning manager 116 when a new provisioning request is made or when there is a failure of dependent resources. When the provisioning manager 116 receives published failure information, the resource registration 124 seeks to indicate that failure as quickly as possible so that resources can be released to provision other requests.

A resource time-series model 120 represents resource consumption based on monitored traffic from provisioning various virtual server instances. The model is used by the provisioning manager 116 to predict future resource needs based on past usage patterns. Parameters of the resource time-series model 120 may therefore be updated during operation to reflect up-to-date resource information based on ongoing monitoring of virtual server instance deployments.

The model may consider a variety of different factors. Processor usage represents the percentage of processor utilization over time, including both overall usage and usage by specific processes or applications. Memory usage represents the amount of memory used by a virtual server instance over time, including both overall usage and usage by specific applications or processes. Network bandwidth represents the amount of data transmitted and received by the virtual server instance over time, including both overall usage and usage by specific protocols or applications. Storage usage represents the amount of storage used by the virtual server instance over time, including overall usage and usage by specific applications or files. Input/output (I/O) performance represents the performance of I/O subsystems over time, including metrics such as read/write throughput and latency. Network latency represents the amount of time it takes for network packets to travel between the virtual server instance and other systems on the network, including both average latency and latency outliers. Application-specific metrics are specific to the applications running on the virtual server instance, such as the number of requests processed, the number of errors encountered, and the response time of specific operations.

The resource time-series model 120 may be implemented as a predictive model, used by the provisioning manager 116 to forecast future resource needs based on historical resource consumption patterns. The model may include a recurrent neural network (RNN) or a long-short-term memory (LSTM) neural network. The model 120 may be trained by collecting historical data, preprocessing the data, and iteratively optimizing the corresponding neural network's parameters using backpropagation, while evaluating and adjusting the model's performance using a separate set of validation data. The outputs of the model 120 may include forecasts of future resource needs. These predictions can help to determine resource consumption patterns so that provisioning manager 116 can make decisions about resource allocation and provisioning for virtual server instances.

Features can be extracted from the available data to capture general patterns or characteristics of the virtual server instance provisioning. For example, aggregate statistics can be collected, such as the average number of provisioned requests or the average response time over a certain period on dependent components.

Provision request analysis 118 may include an application programming interface (API) that allows users to submit provisioning requests and to retrieve status updates, which may be synchronous or asynchronous, depending on the length of the processed requests. The provisioning API may be synchronous or asynchronous, depending on the length of processed requests. The provision request analysis 118 coordinates with the provisioning manager 116 to manage the provisioning process. The analysis may include coordinating with provisioning manager 116 to handle the submission and retrieval of provisioning requests.

Provision prediction 122 constructs a provisioning plan and adjusts the plan according to time-series database changes. Historical data and live data are used to predict the resources for a new virtual server instance provisioning request. The historical data can be treated as a baseline, with live data being used to generate a delta for predictions. The length of time a resource has been locked may also be used as an input to the prediction. Provision prediction 122 include any appropriate decision-making model, such as a decision tree, a regression model, or a neural network model, to predict a utility cost of resources. The provision prediction 122 generates a prediction for when a given resource will be needed, and how much.

The resource time-series model 120 may take into account real available (e.g., unallocated) resources and locked resources for prediction. Locked resources may, for example, represent those resources which have already been allocated for use by a different virtual server instance. The provision prediction 122 may incorporate the information about real available resources and locked resources during the prediction phase, adjusting its forecasts and predictions to ensure that the provisioning plan aligns with actual resource constraints.

A provisioning plan may include a set of resource needs for a given virtual server instance. For example, a given provisioning request may include requests for a particular number and type of processors, an amount of working memory, and an amount of storage. The provisioning plan for such a request may indicate specific resources to satisfy the request, including identifications of particular servers, storage devices, and network configuration information. In addition to such hardware-level provisioning, the provisioning plan may include operating system-level and application-level configuration information.

The virtual server instances that are implemented and provisioned by the IaaS computing system 100 may perform a variety of functions, each with its own respective needs:

A webserver may call for the provisioning of 1-4 processor cores, depending on the traffic and complexity of the web content being served, at least 2-4 GB of memory for running the web server software and caching frequently accessed content, sufficient network bandwidth to handle incoming and outgoing traffic depending on the amount of web traffic being served, and additional storage for web content, logs, and backups.

An application server may call for the provisioning of 2-8 processor cores depending on the complexity of the application and the number of concurrent users, at least 4-16 GB of memory depending on the size and complexity of the application, network bandwidth that may depend on the number of users and size of the application, and any additional storage needed for application data, logs and backups.

A database server may call for the provisioning of 4-16 processor cores depending on the size and complexity of the database and the number of concurrent users, at least 16-64 GB of memory depending on the size of the database and workload, network bandwidth that may depend on the number of users and the size of the database, and high-performance storage for storing the database itself, which may include solid state drives or other specialized storage devices.

Compute-optimized virtual storage instances may generally call for the provisioning of 8-64 high-performance processing cores depending on the workload, at least 16-128 GB of memory depending on the size and complexity of the workload, network bandwidth that may depend on the nature of the workload, and any additional storage needed for input data, intermediate results, or output data. Provisioning the storage may also call for specialized storage devices, such as high-speed nonvolatile memory express drives or network-attached storage devices. In such systems, relatively greater amounts of processing resources are provisioned.

Memory-optimized virtual storage instances may generally call for the provisioning of 2-8 CPU cores depending on the workload, from 32 GB up to terabytes of memory depending on the size and complexity of the workload, network bandwidth that may depend on the nature of the workload, and any additional storage needed for input data, intermediate results, or output data. Provisioning the storage may also call for specialized storage devices, such as high-speed nonvolatile memory express drives or network-attached storage devices. In such systems, relatively greater amounts of memory resources are provisioned.

Figure 2:
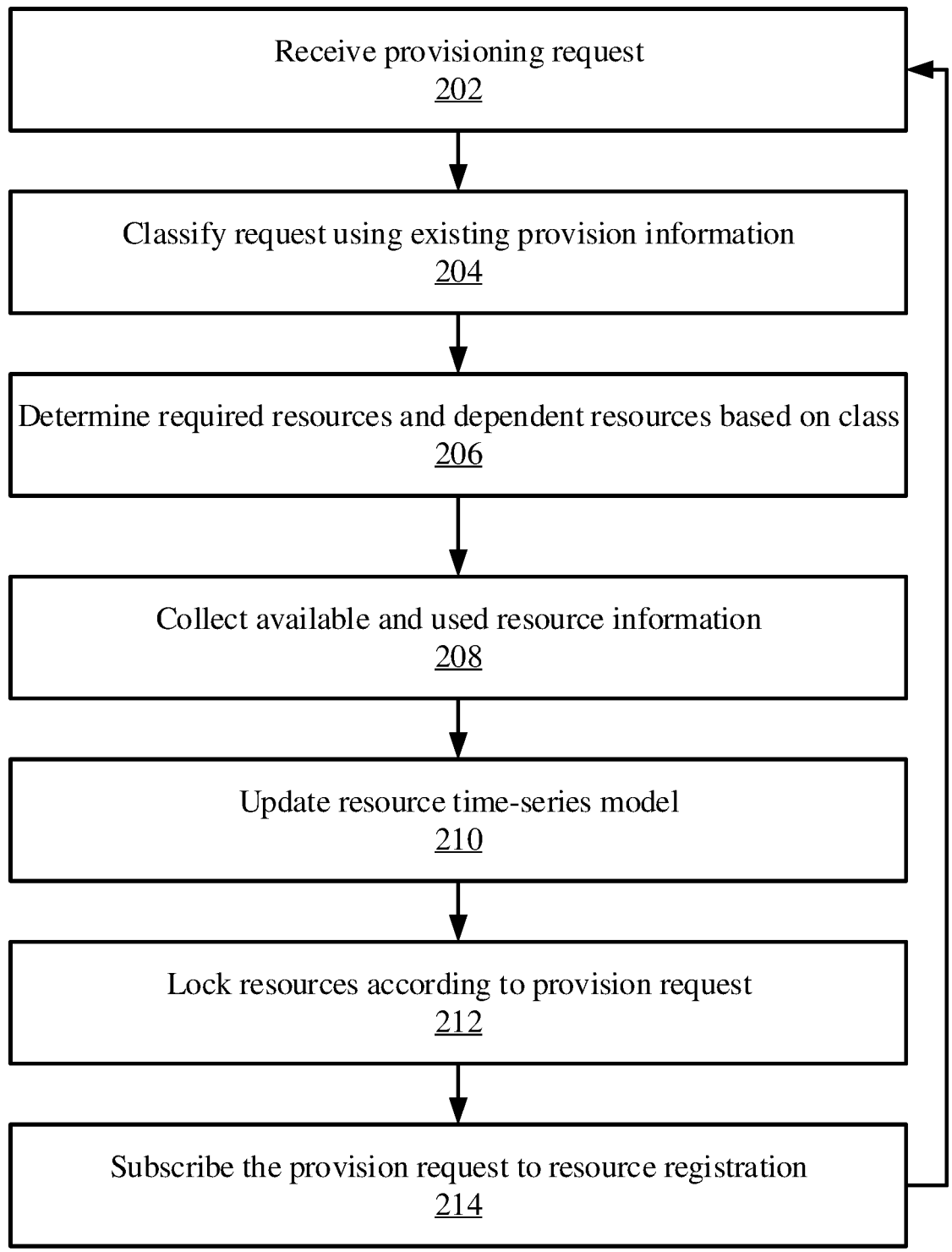
FIG. 2 is a block/flow diagram of a method for provisioning resources to a virtual server instance responsive to a request, in accordance with an embodiment of the present invention.

Referring now to FIG. 2, a method for handling provisioning requests is shown. Block 202 receives the provisioning request, for example using an appropriate API. The provisioning request may identify a particular virtual server instance. Block 204 classifies the request using existing provision information. For example, this information may relate to the known requirements for the requested virtual server instance and any dependent resources. The classification may follow the different types of virtual server instances described above, or may represent any appropriate types. Block 206 determines the required resources and dependent resources needed by the requested virtual server instance according to the classification.

Block 208 collects available and used resource information from, e.g., the resource monitor 110. This information may include identifying a total amount of each physical resource that exists within the IaaS computing system 100, as well as the amounts of each resource that are already locked by virtual server instances. Using the collected traffic from provisioning previous virtual server instances, block 210 updates a resource time-series model 120 that can be used to predict future resource needs based on past usage patterns.

Using the resource time-series model 120, a set of resources may be identified for the provisioning request. Block 212 locks these resources using the resource lock manager 112, thereby reserving the resources in question for the requested virtual server instance. Block 214 then subscribes the provision request to resource registration 124. This subscription makes the resource request responsive to any resource failures, so that resources may be allocated or reallocated in the event the status of some resource changes, or a resource becomes unavailable. Processing may then return to block 202 to handle the next provisioning request.

Figure 3:
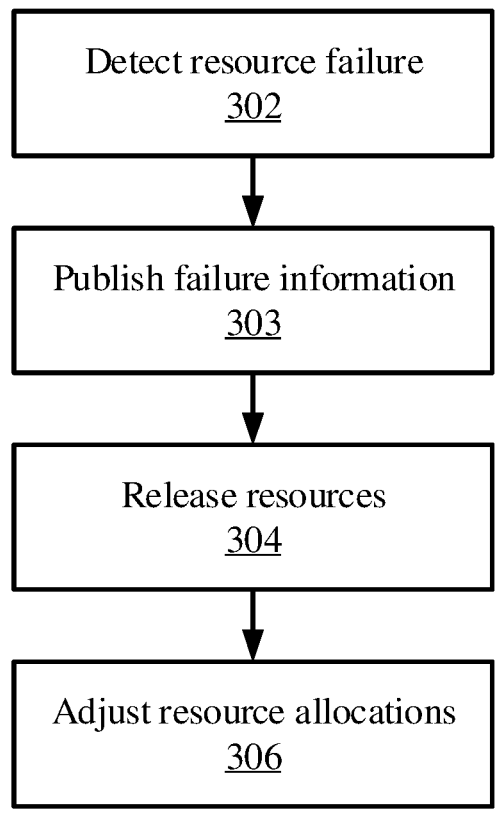
FIG. 3 is a block/flow diagram of a method for detecting and adapting to resource failures, in accordance with an embodiment of the present invention.

Referring now to FIG. 3, a method for handling failures of resources is shown. Block 302 detects the failure of a resource, such as a dependent resource, using resource monitor 110. Block 303 then publishes information about the resource failure to subscribed virtual server instances using the resource registration 124. Failure of a resource, such as a dependent resource, means that the resource becomes unavailable or stops working properly. The consequences of a resource failing after a virtual server instance has been provisioned can vary, depending on the specific resource and its role within the infrastructure. For example, failure of a resource may result in degraded or reduced functionality of the provisioned virtual server instance, may lead to a complete service disruption, or may trigger automatic failover to alternative resources.

When the provisioning manager 116 receives failure information from resource registration 124, it releases resources to allow provisioning of other requests in block 304. Releasing resources may, in some cases, involve revising the resources made available to a different virtual server instance to deallocate them and free them up for the virtual server instance experiencing a failure. In some cases, the resources may have been allocated for a pending provisioning request and may be reallocated to the virtual server instance. In some cases, resources may have been held in reserve to handle shortfalls, and may these resources may be allocated to address the failure.

The provisioning manager 116 continues to monitor resource utilization and adjusts resource allocations as need to ensure optimal usage in block 306. This adjustment may include modification of a provisioning plan to compensate for the failure of a provisioned resource. For example, the provisioning manager 116 may receive information from the resource monitor 110 on an ongoing basis during the operation of the provisioned virtual server instance, analyzing current usage patterns and trends. Based on this analysis, when the provisioning manager 116 identifies over- or under-utilization conditions for resources by the virtual server instance, the provisioning manager may make adjustments to the provisioning plan for that virtual server instance to allocate additional resources or to deallocate and reclaim unused resources. The provisioning manager 116 may then use the resource lock manager 112 to allocate these resources or to reclaim the resources as needed, to promote optimal resource usage and to balance workload distribution.

Figure 4:
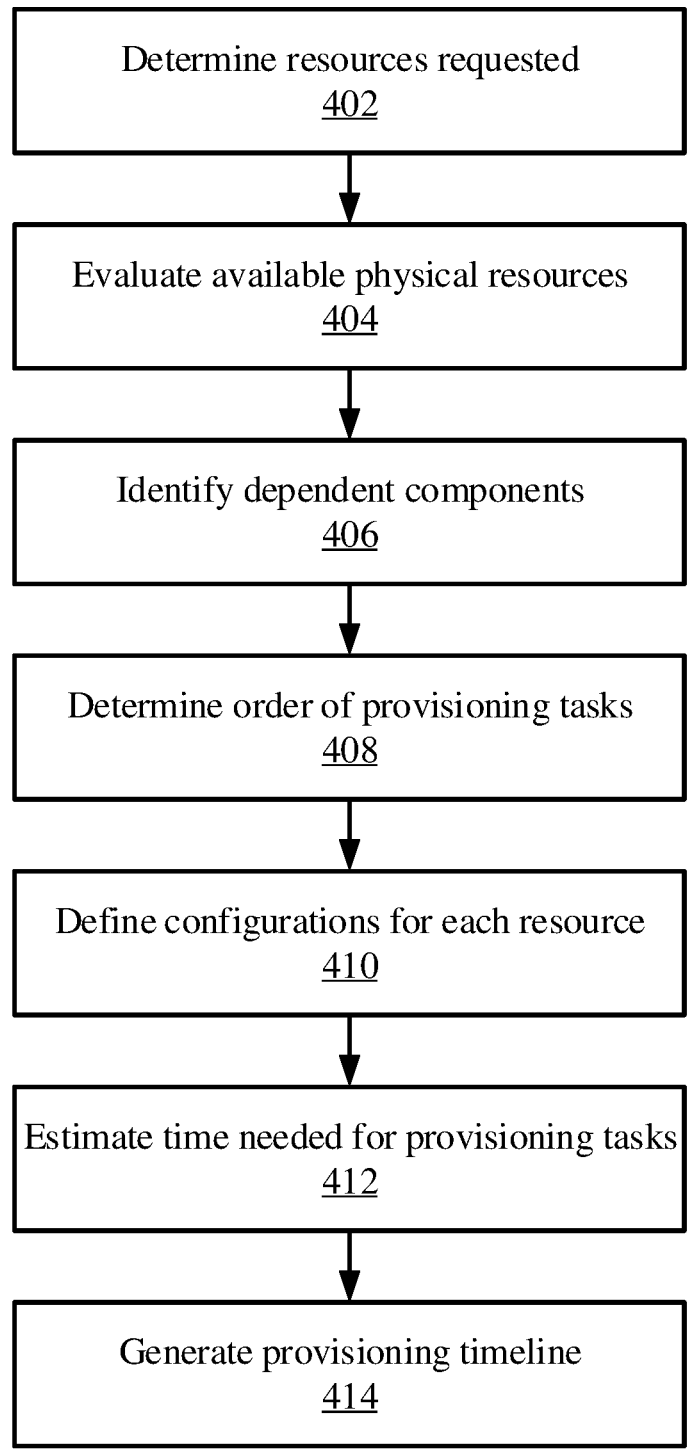
FIG. 4 is a block/flow diagram of a method for generating and implementing a provisioning plan that accounts for dependency relationships, resource availability, and provisioning task timing, in accordance with an embodiment of the present invention.

Referring now to FIG. 4, a method for forming a provisioning plan is shown. The provisioning plan may be generated by the provisioning manager 116, for example with input from the provision request analysis 118, resource time-series model 120, and provision prediction 122, to create a detailed set of configuration instructions for provisioning a given virtual server instance request. Block 402 determines the resources that are indicated in the request, for example including particular hardware and software resources that are needed to execute the task of the virtual server instance. Block 404 then evaluates the available physical resources corresponding to the request. If the available physical resources cannot accommodate the request, then the provisioning plan can stop at this point.

Block 406 identifies dependent components. For example, even if a particular physical resource is not explicitly specified in the provisioning request, it may be needed to support a software resource that is specified. Such dependent resources are added to those which were explicitly specified, as all will be needed to adequately provision the virtual server instance.

Block 408 determines an order of provisioning tasks. Some provisioning tasks may have temporal dependencies, for example with dependent resources that need to be provisioned first, before the task can be completed. One example of such a temporal ordering may be a need for physical storage resources to be allocated before software resources can be provisioned. If these tasks were performed out of order, then the software resource provisioning task would fail for a lack of available storage space. Thus, the order of the provisioning tasks may be based on dependency relationships between resources.

Block 410 defines configurations for each resource in the provisioning plan. These configurations may include configurations for hardware resources, such as providing network access information for hardware networking resources. The configurations may also pertain to software resources, for example providing configurations needed for a software application like a webserver. These configurations may include any appropriate degree of granularity.

Block 412 estimates an amount of time needed to perform the provisioning tasks. For example, allocating physical resources may take a known amount of time, and provisioning and configuring software resources may similarly be predictable. Block 414 can then generate a provisioning timeline based on the order of provisioning tasks from block 408 and the estimated durations generated by block 412. This timeline can be used by the provisioning manager 116 to control the resource lock manager 112 and resource allocator 114 to perform the provisioning tasks in the correct order.

The information generated through this process is collected into a provisioning plan that can be executed to satisfy the virtual server instance provisioning request. The provisioning plan may further be revised during operation to respond to changes in the availability of particular resources, such as when a software application is upgraded or when physical resources fail.

Figure 5:
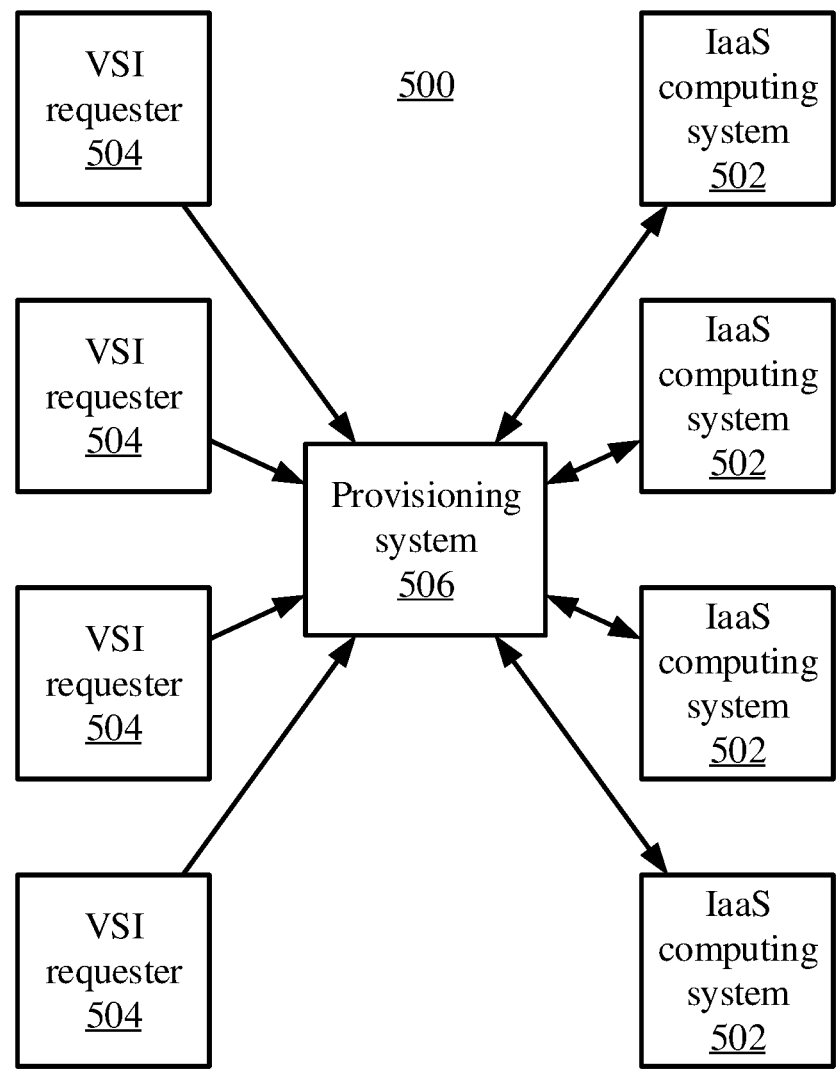
FIG. 5 is a block diagram of a distributed IaaS computing environment that includes dynamic resource provisioning for virtual server instances, in accordance with an embodiment of the present invention.

Referring now to FIG. 5, a distributed IaaS computing environment 500 is shown. Whereas the IaaS computing system 100 is described above as including all of the provisioning components needed to implement a virtual server instance request, it should be understood that these components need not all be contained within a single IaaS computing system. In a distributed IaaS computing environment 500, multiple IaaS computing systems 502 may be available, each with their own respective resources.

In such an environment 500, provisioning may be performed by a separate provisioning system 506 which may perform the functions of the provisioning manager 116 described above. The other functional components of the standalone IaaS computing system 100 may be implemented within the respective IaaS computing systems 502 or within the provisioning system 506 as appropriate. Virtual server instance requesters 504 may make their requests to the provisioning system 506, which may then orchestrate the provisioning of the IaaS computing systems' resources as needed.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
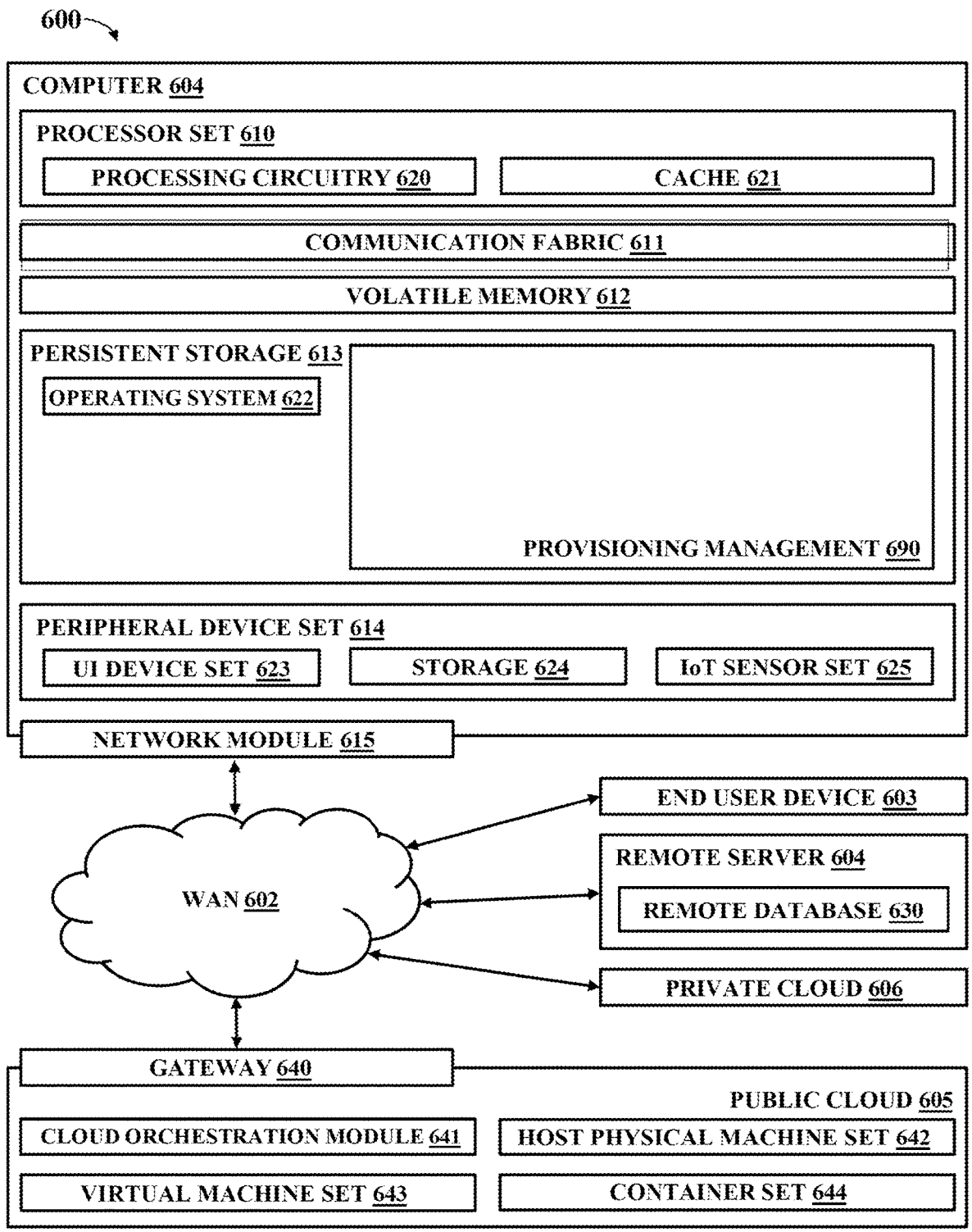
FIG. 6 is a block diagram of a computing environment that can perform provisioning management, in accordance with an embodiment of the present invention.

Referring now to FIG. 6, a diagram of an exemplary computing environment 600 is shown. Computing environment 600 contains an example of an environment for the execution of at least some of the computer code involved in performing the inventive methods, such as provisioning management 690. In addition to block 200, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 200, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 200 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 614 includes the set of peripheral devices of computer 601.

Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices.

Computer readable program instructions for performing the inventive methods can typically be downloaded to computer 601 from an external computer or external storage device through a network adapter card or network interface included in network module 615. WAN 602 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

Figure 7:
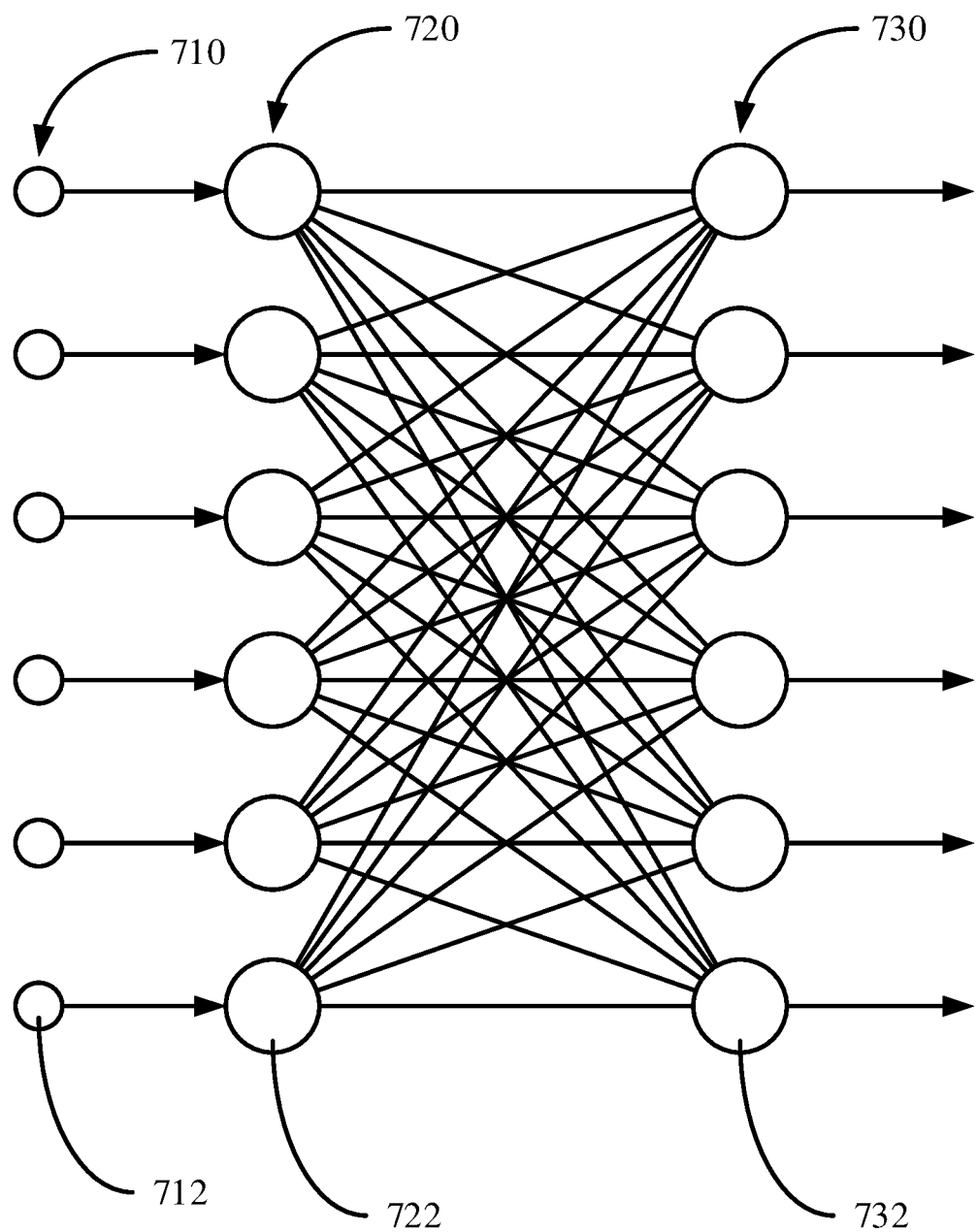
FIG. 7 is a neural network architecture that can form part of a resource time-series model, in accordance with an embodiment of the present invention.
Figure 8:
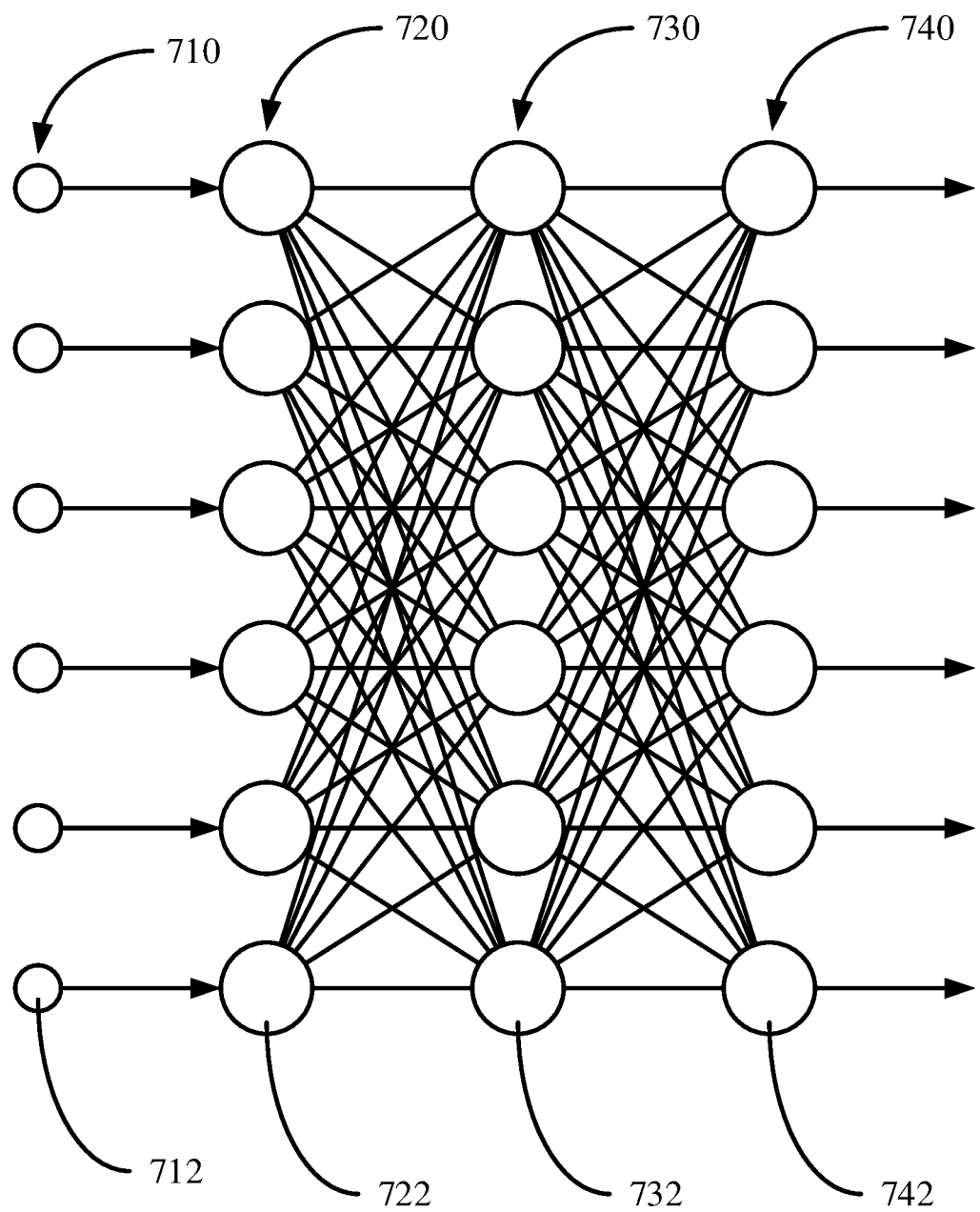
FIG. 8 is a deep neural network architecture that can form part of a resource time-series model, in accordance with an embodiment of the present invention.

Referring now to FIGS. 7 and 8, exemplary neural network architectures are shown, which may be used to implement parts of the present models, such as the resource time-series model 120. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Having described preferred embodiments of dynamic provisioning for virtual server instances (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for resource provisioning, comprising:
   classifying a request for a virtual server instance (VSI) according to resources specified in the request to determine a requested type of VSI;
   predicting dependent resources that the VSI will use based on the specified resources and the requested type of VSI;
   generating a provisioning plan, including timing and configuration information, based on the specified resources, the dependent resources, live resource usage data, historical resource usage data, and a length of time that a resource has been locked, to predict how much of a given resource will be needed and when; and
   provisioning resources for the VSI according to the provisioning plan, including allocating hardware resources on a computing system.

2. The method of claim 1, wherein generating the provisioning plan includes determining an order of provisioning tasks for the specified resources and the dependent resources based on dependency relationships.

3. The method of claim 2, wherein provisioning resources includes executing the provisioning tasks according to the determined order to ensure availability of dependent resources.

4. The method of claim 2, wherein determining the order is based on a predicted amount of time for the allocation of physical resources and configuring software resources.

5. The method of claim 1, further comprising:
   detecting a failure of a provisioned resource for the VSI; and
   modifying the provisioning plan to allocate additional resources to compensate for the failure of the provisioned resource.

6. The method of claim 5, wherein modifying the provisioning plan includes deallocating resources from a second VSI to make them available for the provisioning plan.

7. The method of claim 1, further comprising evaluating resource usage by the VSI after provisioning to determine over- or under-utilization of the provisioned resources.

8. The method of claim 7, further comprising modifying the provisioning plan to deallocate or allocate resources to correct respective over- or under-utilization conditions.

9. The method of claim 1, wherein generating the provisioning plan includes a determination of resources available at the computing system, including allocated resources and unallocated resources.

10. The method of claim 1, wherein classifying the request includes predicting future resource usage based on a resource time-series model that is trained on historical provisioning data.

11. A computer program product for resource provisioning, the computer program product comprising a non-transitory computer readable storage medium having program instructions embodied therewith, the program instructions executable by a hardware processor to cause the hardware processor to:
    classify a request for a virtual server instance (VSI) according to resources specified in the request to determine a requested type of VSI;
    predict dependent resources that the VSI will use based on the specified resources and the requested type of VSI;
    generate a provisioning plan, including timing and configuration information, based on the specified resources, the dependent resources, live resource usage data, historical resource usage data, and a length of time that a resource has been locked, to predict how much of a given resource will be needed and when; and
    provision resources for the VSI according to the provisioning plan, including allocating hardware resources on a computing system.

12. A system for resource provisioning, comprising:
    a hardware processor; and
    a memory that stores a computer program which, when executed by the hardware processor, causes the hardware processor to:
       classify a request for a virtual server instance (VSI) according to resources specified in the request to determine a requested type of VSI;
       predict dependent resources that the VSI will use based on the specified resources and the requested type of VSI;
       generate a provisioning plan, including timing and configuration information, based on the specified resources, the dependent resources, live resource usage data, historical resource usage data, and a length of time that a resource has been locked, to predict how much of a given resource will be needed and when; and
       provision resources for the VSI according to the provisioning plan, including allocating hardware resources on a computing system.

13. The system of claim 12, wherein the computer program further causes the hardware processor to determine an order of provisioning tasks for the specified resources and the dependent resources based on dependency relationships.

14. The system of claim 13, wherein the computer program further causes the hardware processor to execute the provisioning tasks according to the determined order to ensure availability of dependent resources.

15. The system of claim 12, wherein the computer program further causes the hardware processor to:
    detect a failure of a provisioned resource for the VSI; and
    modify the provisioning plan to allocate additional resources to compensate for the failure of the provisioned resource.

16. The system of claim 15, wherein the computer program further causes the hardware processor to deallocate resources from a second VSI to make them available for the provisioning plan.

17. The system of claim 12, wherein the computer program further causes the hardware processor to evaluate resource usage by the VSI after provisioning to determine over- or under-utilization of the provisioned resources.

18. The system of claim 17, wherein the computer program further causes the hardware processor to modify the provisioning plan to deallocate or allocate resources to correct respective over- or under-utilization conditions.

19. The system of claim 12, wherein the computer program further causes the hardware processor to determine resources available at the computing system, including allocated resources and unallocated resources.

20. The system of claim 12, wherein the computer program further causes the hardware processor to predict future resource usage based on a resource time-series model that is trained on historical provisioning data.

* * * * *